Nov. 23, 1937. A. J. CARVER 2,099,723
90° BEND, FLEXIBLE PIPE CLEANING TOOL
Filed Sept. 18, 1936
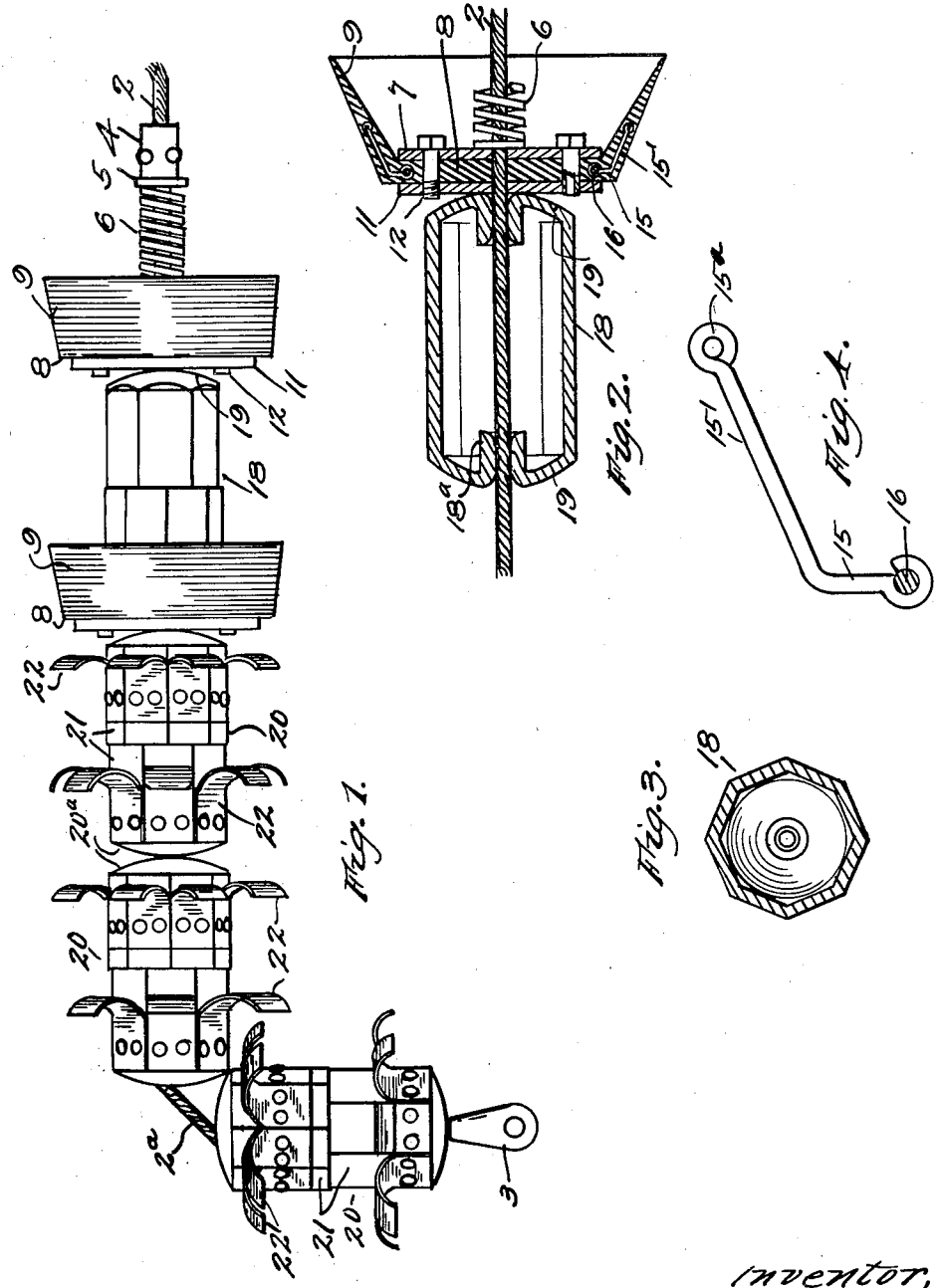

Patented Nov. 23, 1937

2,099,723

UNITED STATES PATENT OFFICE 2,099,723

90° BEND, FLEXIBLE PIPE CLEANING TOOL

Andrew J. Carver, Walters, Okla.

Application September 18, 1936, Serial No. 101,441

8 Claims. (Cl. 15—104.06)

This invention is a scraper-type, flexible, pipe cleaning tool for use in underground pipe systems of various kinds, though its not limited to such use.

In cleaning such pipe systems it is desirable to employ a scraping cleaner that is capable of making a short-radius bend at intersections of pipe lines or branches meeting at angles as sharp as 90° of arc.

It is an object of this invention to provide a pipe cleaner of such flexible structure that it may be readily advanced through a pipe line in which bends or branches of 90° of arc may occur.

Further, an object of the invention is to provide a water-pressure driven pipe scraper having a flexible backbone structure and including a set of spaced, cup-like piston heads having flexible relation in the train or backbone, and to provide pistons having capacity for making a good rim seal in the pipe bore and at the same time are designed to provide a flexible, yielding action so as to slide past bore irregularities due to structural features or to hard accumulations not removable by the advancing scraper means acting in front of the driving pistons. Also, an object of the invention is to provide, in a pipe cleaner of this type, a piston member in which the bore surface engaging means consists of a peripherally continuous thin, flexible flange of rubber, or other suitable material, which is internally reinforced by resilient ribs which act to flare the flange; the piston being free of metallic parts possibly engaging the pipe bore surface.

Another object of the invention is to provide a flexible, scraper-carrying backbone of substantial, light-weight sections yieldably held in tilting abutment in a train and connected by means tending to automatically, axially aline the backbone sections as the tool moves in a pipe line, without dependence upon the reaction of the pipe bore for such normal, straightening of the flexible backbone.

In other words, an object of the invention is to provide a normally straight, resilient, flexible backbone, scraper type of cleaner having body sections which abut end on end and have lateral tilting function; the sections being of such length as to permit a bending of the backbone sections, on each other in pipe angles of 90° arc.

The invention consists of certain advancements in this art as set forth in the ensuing disclosure and having, with the above, additional objects and advantages as hereinafter developed, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinbelow.

Figure 1 is a side elevation of the tool showing a position of the backbone sections in bending in a 90° angle. Figure 2 is a detail, axial section of a part of the backbone and a piston thereof. Figure 3 is a cross-section of a backbone section or member. Figure 4 is a detail view of a piston rib.

The disclosed embodiment of the tool includes a stout, flexible, spinal cable 2, the forward end of which has a suitable hitch eye 3 to attach to a lead line (not shown) and the rear end of the cable 2 has a cable clamp 4, of desired form. The clamp is engaged by a thrust washer 5, on the cable, supporting the near end of a helical, expansion spring 6 through which the cable extends.

The spring 6 reacts against a stiff metal disc 7 axially mounted on the cable and as here illustrated forming the rear support for a flexible, cup-shaped piston the discoidal body 8 of which is of a diameter somewhat less than that of the pipe bore to be cleaned, and the annular, rearwardly extending flange 9 of which flares at an acute angle (to the piston axis) and itself tapers to a thin edge capable of readily conforming to the size and configuration of the immediately adjacent pipe bore so as to accomplish a good sliding seal therewith when a head of water pressure is established in the pipe and against the rear, flanged side of the piston 8 whereby to drive the scraping tool along the pipe bore.

The forward side of the piston 8 is supported by a disc 11 loosely mounted on the cable 2 and means are provided to connect the discs 11—7 and to provide for flow of water to the forward side of the disc 11. This connecting means includes a plurality of tubular screws 12 passing through the discs and the interposed piston body 8 and clinching them by screwing into the disc 11.

A feature of the piston structure is the elimination of contact of its metal parts with the surface of the pipe bore being scraped, and the provision of means to reinforce and resiliently spread the flange in addition to its own resiliency and to the expanding effect of water pressure in the cup flange. Such means includes a plurality of individual spring bars forming spaced ribs 15 embedded in the annular corner where the flange 9 joins the body 8 of the piston. The inner ends of the ribs 15 are hooked onto a circular anchor ring 16 embedded in the rubber body 8 at a location between the clamping discs 7—11. The ribs extend radially to the flange corner and thence rearwardly at 15' in the flange 9 and have end eyes 15ᵃ in which the rubber keys itself.

A pair of the pistons 8 is mounted on the cable 2 and they are spaced by a firm backbone body section 18 through which the cable extends loosely, axially. This section is an elongated body of suitable material, and may be a hollow, metal casting as shown, and has rounded end faces 19 against which the contiguous end discs of the pistons 8 are firmly pressed by the reaction of the expansion spring 6. The pistons have a tilting capacity on the rounded ends of the spacing section 18.

The scraping function of the tool is performed by means of gangs of flexible claws fixed on relative backbone, body sections. The sections preferably include a suitable number of elongated, hollow, metal castings 20 similar to section 18 and have, at each end portion, a number of flat, longitudinal facets 21 on each of which is rigidly secured the inner ends of spring claws 22 which extend radially and curve forwardly in the direction of pressure drive of the tool. The sections 20 are shown as of octagonal cross-section; the facets of one end of the section being symmetrically offset or staggered as to those of the other end of the section; whereby to offset the angular relation of the two annular gangs of claws 22 so that the rear claws will move along the pipe bore in paths partly not covered by the relative forward gang on the same backbone section 20.

Thus it will be possible to have a claw coverage effect in a full circle about any one section 20 and to permit free, relative rotation of the claw-carrying sections 20 on the cable 2.

The sections 20 have rounded end faces 20ᵃ with internal hubs (as 18ᵃ in Fig. 2) in which the cable 2 fits and slides.

The gangs of claws 22, on each body section, are spaced and serve to axially support the section in the pipe bore in which the tool is being used.

With a desired number of the scraper sections 20 and the pistons and their spacer section 18 mounted on the cable 2 the spring 6 acts expansively to crowd all of the forward elements on the cable toward the hitch eye 3, with a tendency to hold them in axial alinement and straighten the whole backbone assembly. In such alinement the claws will press outward in firm engagement with the pipe bore surface and when water head acts with enough pressure on the pistons 8 the flexible tool will be driven ahead and the bore scraped.

In the event that a bend, say as sharp as 90°, is met in the pipe line the leading scraper unit or section 18 will be deflected accordingly, Fig. 1, as to and on the forward end of the next following section, which serves as a fulcrum for its leader. This will result in such a tension on the spinal cable 2 as will effect a compensatory contraction of the spring 5 to give out enough of the cable 2 to allow the bend thereof at 2ᵃ as the leading section or sections 18 tilt or rock to the desired angle along the train or backbone. The compensating spring 6 retracts the cable as the sections again come into axial alinement and automatically restores the flexible backbone to a normally straight form.

The spring 6 thus allows not only for the resilient flexing of the scraper units one on the other but also gives the same flexing capacity to the spaced, drive pistons 8—8.

The water issuing ahead of the pistons through the tubular fastening screws 12 provides a suitable lubricant for the rubber flanges of the pistons rubbing along the bore of the pipe being scraped.

What is claimed is:

1. A pipe working tool including a series of abutted, scraper-carrying body sections and a piston assembly, a flexible element threaded axially through and on which the sections and assembly are slidable and have relatively free rotation as to each other, a stop on said element to limit end shift of the said series and assembly, and means acting against and to hold the sections and assembly in abutted relation and yieldingly press them in one direction along said element toward said stop.

2. A pipe working tool including a series of relatively rotative body sections each having bore scraping blades, a flexible element freely passing axially through said sections and having a stop limiting end shift of the train of sections, and resilient means on said element for thrusting the sections one against the other in one direction towards the said stop and tending to maintain the train in axial alinement but permitting bending of the train, and a piston slidably and turnably mounted on said element and mounted intermediate said resilient means and said stop and adapted to slide and seal on the pipe bore.

3. A pipe scraping tool including a spinal cable, rotatively unattached backbone sections freely axially receiving the cable to turn and slide thereon and each having radial scrapers to center the sections in train in a pipe bore, a bore fitting piston means free on the cable and unattached to said sections, a stop limiting end shift of the train and piston means, and cushion means for yieldingly pressing the sections and piston into abutment in one direction as to the stop and providing for resilient flexing of the cable and train of sections and piston.

4. A tool as set forth in claim 3 and in which the several sections and the piston means have a tilting relation one on the other and are freely relatively rotative and are retracted from a tilted relation to axial alinement by said cushion means.

5. A pipe scraping tool including a spinal cable, relatively rotative, free, spaced pistons turnably mounted on said cable and having conical flanges for sliding and sealing on the pipe wall, a spacing section loose on the cable and on the ends of which the free pistons may tilt and rotate, a series of rotatively unattached, abutting backbone sections turnably and axially mounted on the cable and having scraping claws, and means on the cable for holding the said pistons and sections in tiltable abutment along the cable.

6. A flexible, mechanical cleaner including a cable, and a train of backbone members threaded end to end on the cable to relatively turn and slide; the abutted ends of the members having convex spheric form to facilitate relative tilting action one on the other, and means on the cable for holding the said members in yieldable, abutted relation along the cable and including a cushioning spring acting to thrust the sections against each other in one direction.

7. A bore scraping tool including a spinal cable, a train of backbone sections which are relatively unattached and are slidable and turnable on the cable, a piston device turnably and slidably mounted on the cable and turnable as to said sections, flexible, radial, centering, bore scrapers fixed to said sections, and means on the cable for limiting end shift of the train including the piston device and including a spring cushion for holding the sections and piston in tiltable abutment along the cable and pressing them in one direction.

8. A bore scraping tool including a flexible spinal cable, a train of rotatively unattached backbone sections slidably and turnably threaded on the cable, spaced stop parts on the cable to limit end shift of the train, and expansile means on the cable for pressing the sections end to end in one direction and permitting relative tilting thereof one on the other and operative to retract the tilted sections into axial alinement.

ANDREW J. CARVER.